(12) United States Patent
Moore (10) Patent No.: US 10,232,794 B1
(45) Date of Patent: Mar. 19, 2019

(54) TRUCK TOOL BOX

(71) Applicant: Ray Moore, Bellwood, NE (US)

(72) Inventor: Ray Moore, Bellwood, NE (US)

( * ) Notice: Subject to any disclaimer, the term of this patent is extended or adjusted under 35 U.S.C. 154(b) by 67 days.

(21) Appl. No.: 15/601,311

(22) Filed: May 22, 2017

(51) Int. Cl.
*B60R 9/06* (2006.01)
*B62D 33/02* (2006.01)

(52) U.S. Cl.
CPC .......... *B60R 9/06* (2013.01); *B62D 33/0207* (2013.01)

(58) Field of Classification Search
CPC .............................. B60R 9/06; B62D 33/0207
USPC ...................................................... 224/404
See application file for complete search history.

(56) References Cited

U.S. PATENT DOCUMENTS

| | | | | |
|---|---|---|---|---|
| 3,967,869 A * | 7/1976 | Jackson | ................ | A01K 97/06 312/201 |
| 4,967,944 A * | 11/1990 | Waters | ................ | B60R 9/00 224/404 |
| 5,207,470 A * | 5/1993 | Rafi-Zadeh | ................ | B60J 7/1614 224/282 |
| 5,484,092 A * | 1/1996 | Cheney | ................ | B60R 7/14 206/317 |
| 6,386,409 B1 * | 5/2002 | Cheney | ................ | B60R 9/00 220/525 |
| 6,554,169 B1 * | 4/2003 | Furlong | ................ | B60R 9/00 224/404 |
| 7,681,767 B2 * | 3/2010 | Cheney | ................ | B60R 9/00 224/404 |
| 8,857,882 B2 * | 10/2014 | Daniels, Jr. | ................ | B25H 5/00 296/37.1 |
| 2012/0187013 A1 * | 7/2012 | Gapinski | ................ | B25H 3/021 206/373 |
| 2017/0253187 A1 * | 9/2017 | Buckland | ................ | B60R 11/06 |

\* cited by examiner

*Primary Examiner* — Peter N Helvey
(74) *Attorney, Agent, or Firm* — Dennis L. Thomte; Thomte Patent Law Office LLC (57) ABSTRACT

A truck tool box including a box portion with an open upper end and a lid hingedly secured to the box portion which is movable between open and closed position. A tray for small loose items is hingedly secured to the underside of the lid and which is movable between a stowed position adjacent the underside of the lid to a display position when the lid is in its open position.

4 Claims, 9 Drawing Sheets

TRUCK TOOL BOX

BACKGROUND OF THE INVENTION

Field of the Invention

This invention relates to a truck tool box and more particularly to a truck tool box wherein a tray for loose items is positioned at the underside of the lid of the tool box. Even more particularly, this invention relates to a truck tool box as described hereinabove wherein the tray may be moved from a stowed position at the underside of the lid of the tool box to a display position when the lid of the tool box is in its open position.

Description of the Related Art

Truck tool boxes have been long provided for positioning in the bed of a pick-up truck. The prior art truck tool boxes normally include a box portion having an open upper end which is selectively closed by a lid which is pivotally secured to the box portion. Some prior art truck tool boxes have their open upper ends closed by a pair of lids.

In the prior art truck tool boxes, large items or tools are placed in the box portion of the tool box without any provision for a means to store small items therein such as screws, bolts, washers, nuts, pins, etc.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

There are many types of truck tool boxes such as a single lid tool box, a mid-lid tool box, a double-lid tool box, etc. Applicant's invention may be used with all types of truck tool boxes wherein the truck tool box has a box portion with the upper end thereof being selectively closed by one or more lids hingedly secured to the box portion thereof.

Applicant's invention will be illustrated and described as being used with a double-lid truck tool box. Inasmuch as both of the lids illustrated and described herein are identical, only one of the lids will be described in detail.

The lid is secured to the box portion so as to be selectively movable between open and closed positions. A tray support frame having an inner end, an outer end, a first side and a second side is provided with the inner end of the tray support frame being hingedly or pivotally secured to the underside of the lid so as to be movable between a stowed position adjacent the underside of the lid to a display position when the lid is in its open position. A tray is positioned on the tray support frame. The tray is designed to contain loose small items such as bolts, screws, nuts, etc. In the preferred embodiment, the tray is selectively removable from the tray support frame.

It is therefore a principal object of the invention to provide a truck tool box including a tray for loose items which is positioned adjacent the underside of the lid when in its first position, and which is hingedly moved to a display portion when the lid is in its open position.

A further object of the invention is to provide a truck tool box including a tray positioned at the underside of the lid thereof.

A further object of the invention is to provide a truck tool box wherein the lid has a tray support frame hingedly secured to the underside of the lid thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a pick-up truck having a bed 12 behind the cab 14 of the truck 10. The numeral 16 refers to a conventional truck tool box 16 which includes a box portion 18. As stated above, some tool boxes have a single lid hingedly secured to the upper end of the box portion 18. As also stated above, some tool boxes have a pair of lids 20 and 20' hingedly mounted on the box portion 18. The instant invention will be described as being used with a tool box 16 having the pair of lids 20 and 20'. As also stated above, Applicant's invention may be used with other types of truck tool boxes such as a single-lid tool box, a mid-lid tool box, etc.

Lid 20 will be described as having a top wall member 22 having an underside 24. Lid 20 has a first side wall or flange 26, an outer wall or flange 28 and a second side wall 30 and an inner wall member 21, which extend downwardly from the periphery of top wall member 22. Lid 20 will be described as having a first side 32, an inner end 34, a second side 36 and an outer end 38. Lid 20 has its inner end 34 hingedly secured, about a horizontal axis 40, to box portion 16 so as to be selectively hingedly moved between closed and open positions in conventional fashion. Lid 20 also has an inwardly extending flange 42 which extends inwardly from the interior sides of wall members 26, 28, 30 and 31.

Figure 5:
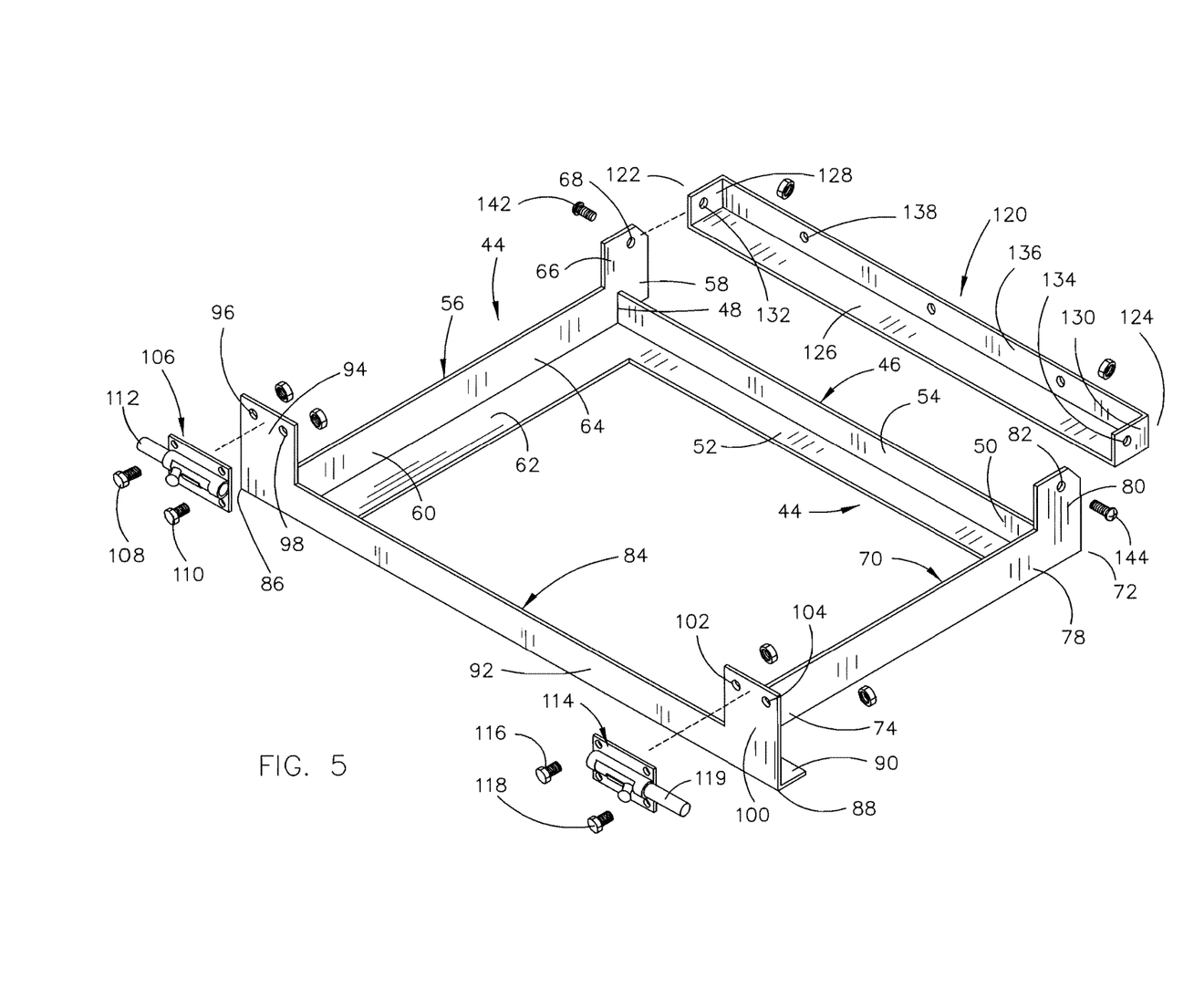
FIG. 5 is an exploded perspective view of the tray support frame of this invention.

The numeral 44 refers to a tray support frame which is positioned at the underside 24 of lid 20. Tray support frame 44 includes an elongated and horizontally disposed inner frame member 46 having a first end 48 and a second end 50. Frame member 46 includes a lower flange 52 and an upstanding flange 54 which extends upwardly from the inner end of frame member 46. Tray support frame 44 also includes an elongated first side frame member 56 having an inner end 58 and an outer end 60. Frame member 56 includes a lower flange 62 and an upstanding flange 64 which extends upwardly from flange 62 as seen in FIG. 5. Frame member 56 includes our upstanding plate 66 at its inner end which has a bolt opening 68 formed therein at its upper end. As seen in FIG. 5, the end 48 of frame member 46 is secured to frame member 56 at the forward end thereof.

Tray support frame 44 also includes an elongated second side frame member 70 having an inner end 72 and an outer end 74. Frame member 70 includes a lower flange 76 and an upstanding flange 78 which extends upwardly from lower flange 76 as seen in FIG. 5. The flange 78 includes an upstanding plate 80 which at its inner end which has a bolt opening 82 formed therein at its upper end. The end 50 of frame member 46 is secured to frame member 70 at the inner end 72 thereof.

Tray support frame 44 also includes an elongated and horizontally disposed outer frame member 84 having a first end 86 and a second end 88. Frame member 84 includes a lower flange 90 and an upstanding flange 92 which extends upwardly from the outer end of flange 90. Frame member 84 also includes an upstanding plate 94 at end 86 thereof and which has bolt openings 96 and 98 formed therein. As seen in FIG. 5, the outer end 60 of frame member 56 is secured to frame member 84 at end 86 thereof. Frame member 84 includes an upstanding plate 100 at end 88 thereof and which has bolt openings 102 and 104 formed therein.

A slide bolt assembly 106 is bolted to plate 94 by bolts 108 and 110. Slide bolt assembly includes a slide bolt 112 which is selectively movable between extended and retracted positions in conventional fashion. A slide bolt assembly 114 is bolted to plate 100 by bolts 116 and 118. Slide bolt assembly 114 includes a slide bolt 120 which is selectively movable between extended and retracted positions in conventional fashion.

Tray support frame 44 includes an elongated and horizontally disposed support 120 having ends 122 and 124. Support 120 includes a lower flange having plates or brackets 128 and 130 extending upwardly from the ends thereof which have bolt openings 132 and 134 formed therein respectively. Support 120 also includes an inner flange 136 which extends upwardly from the inner side of flange 126. Flange 136 has a plurality of bolt openings 138 formed therein.

Figure 6:
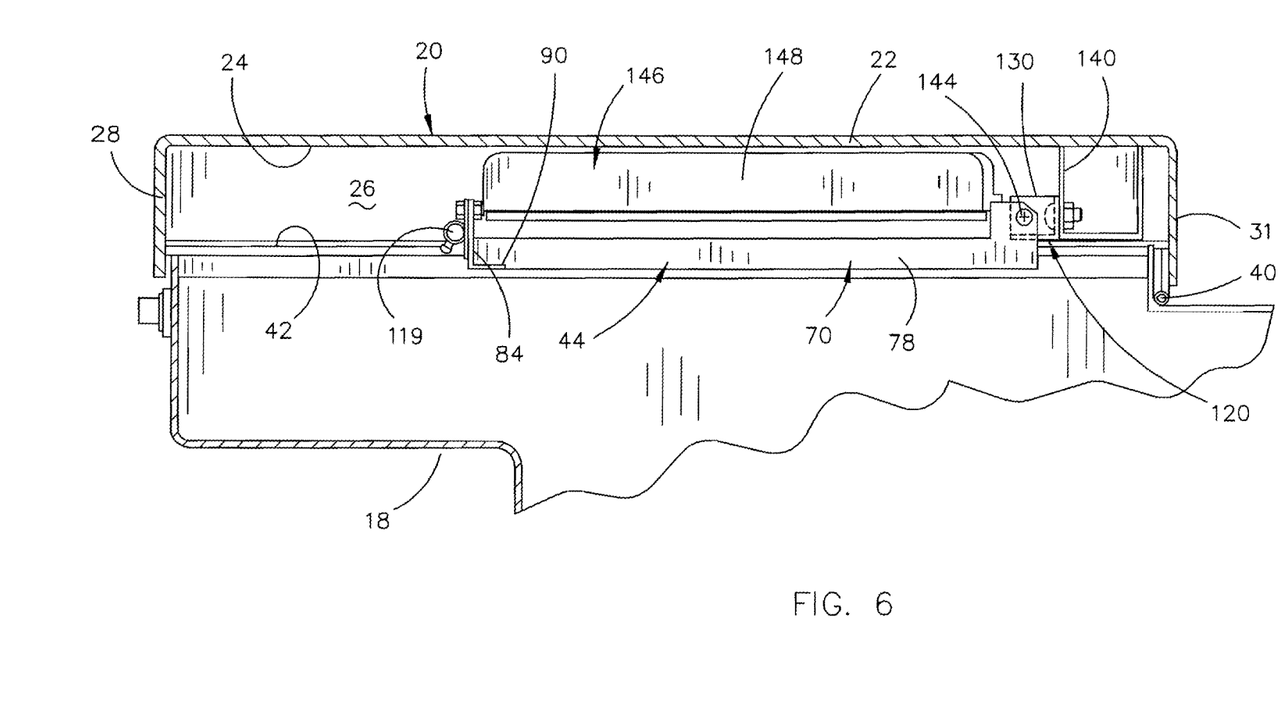
FIG. 6 is a sectional view which illustrates the truck tool box lid in a closed position with the tray support frame and tray positioned at the underside of the lid.
Figure 7:
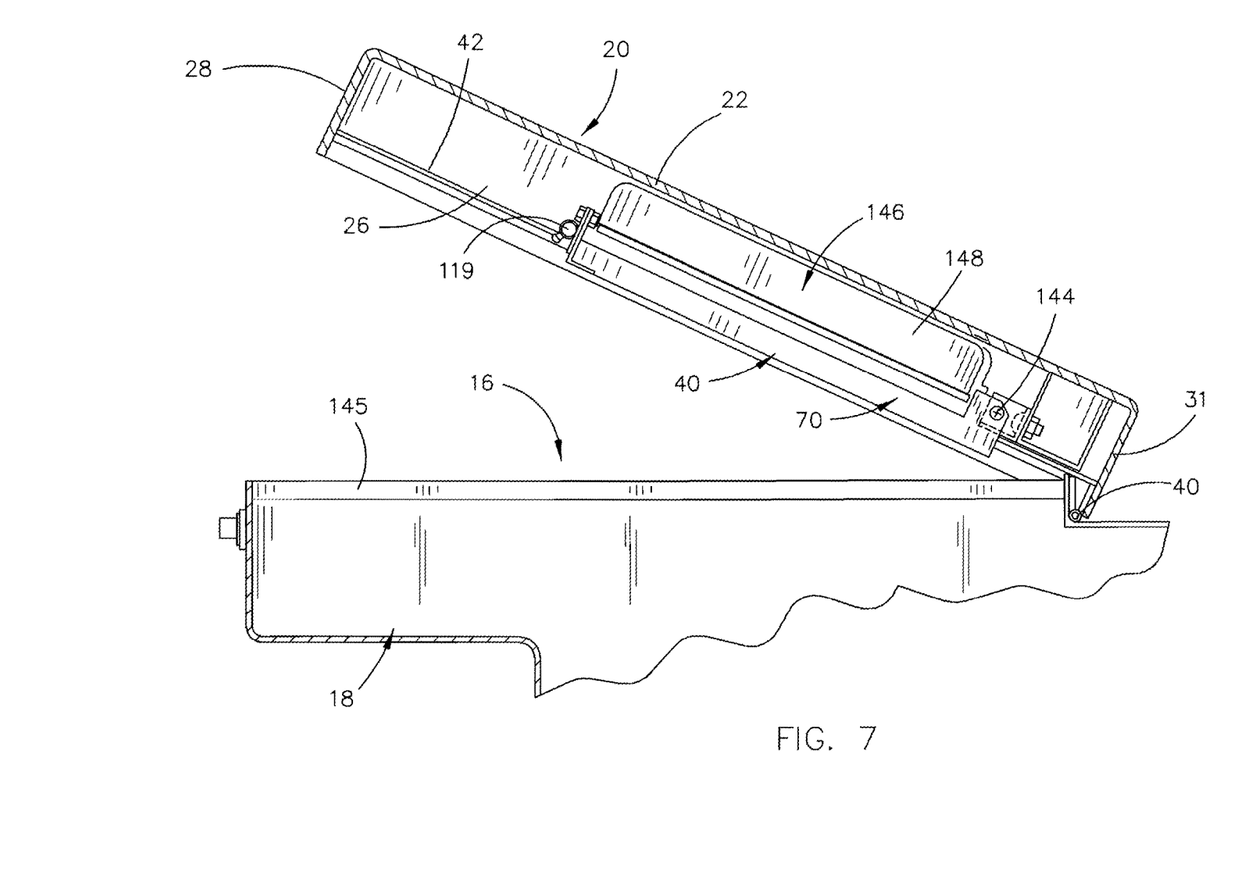
FIG. 7 is a sectional view similar to FIG. 6 but with the truck tool box lid being in an open position and with the tray support frame and tray being in the stowed position.

Inner flange 136 of support 120 is secured to a wall member 140 which extends downwardly from the underside 24 of lid 20 by bolts 141 extending through bolt openings 138 in flange 136 and into bolt openings formed in wall member 140 as seen in FIG. 6. Support frame 44 is pivotally secured to support 120 by a bolt 142 extending through bolt opening 68 in plate 66 and through bolt opening 132 in plate 128 of support 120 and by a bolt 144 extending through bolt opening 82 in plate 80 and through bolt opening 134 in plate 130 of support 120.

Figure 2:
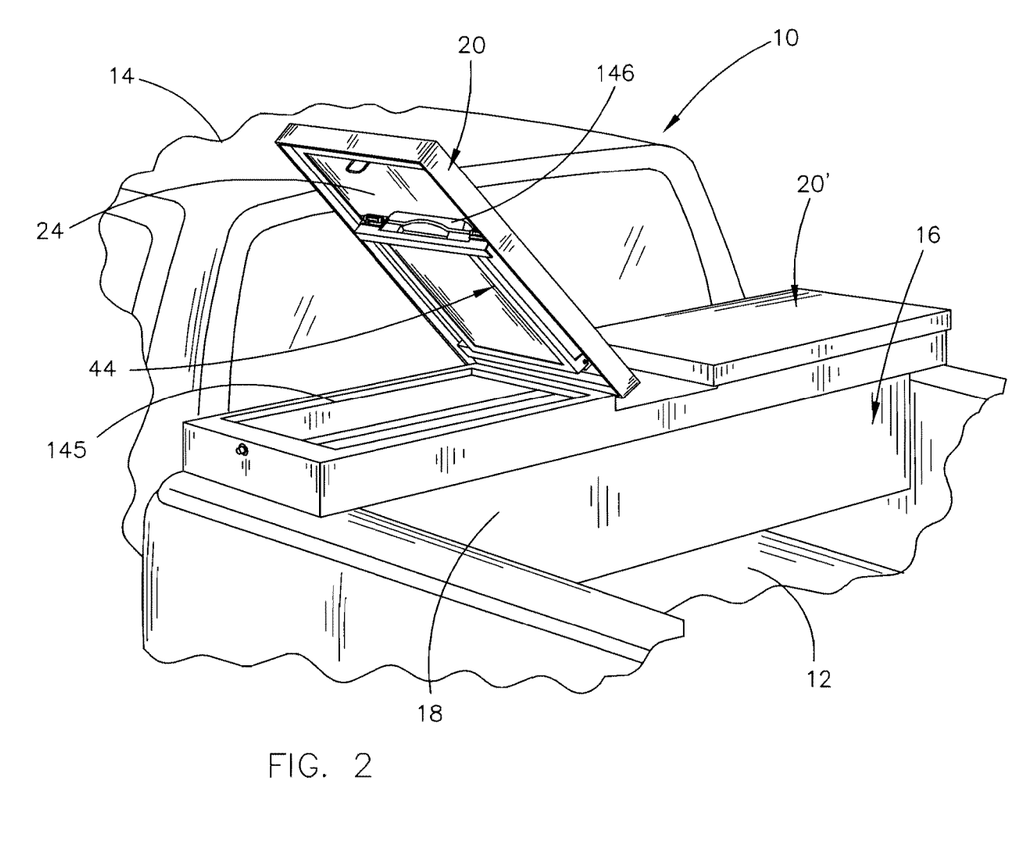
FIG. 2 is a rear perspective view of a truck tool box positioned in the bed of a truck with one of the lids of the truck tool box being in an open position and with the tray support frame and tray in a stowed position at the underside of the lid.
Figure 3:
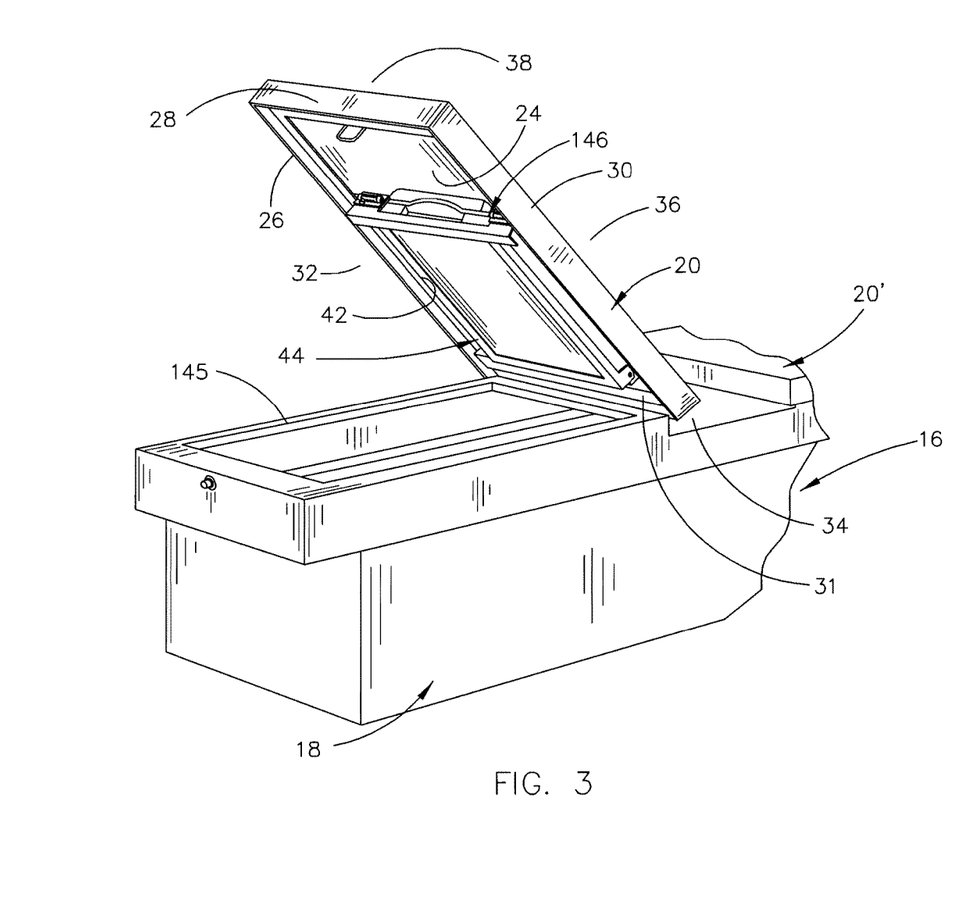
FIG. 3 is a perspective view similar to FIG. 2 except that the truck is not shown.
Figure 4:
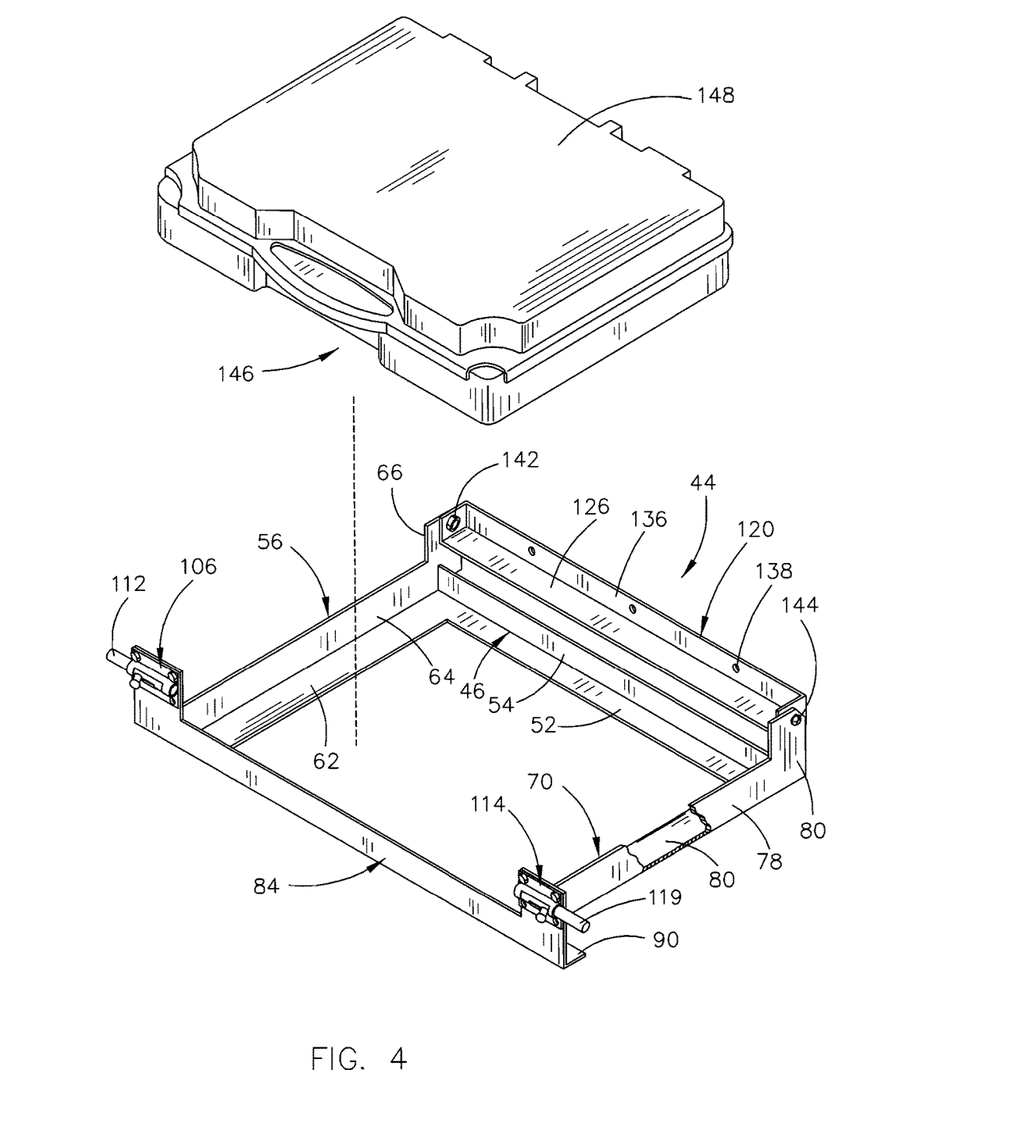
FIG. 4 is a perspective view of the tray support frame and tray.
Figure 8:
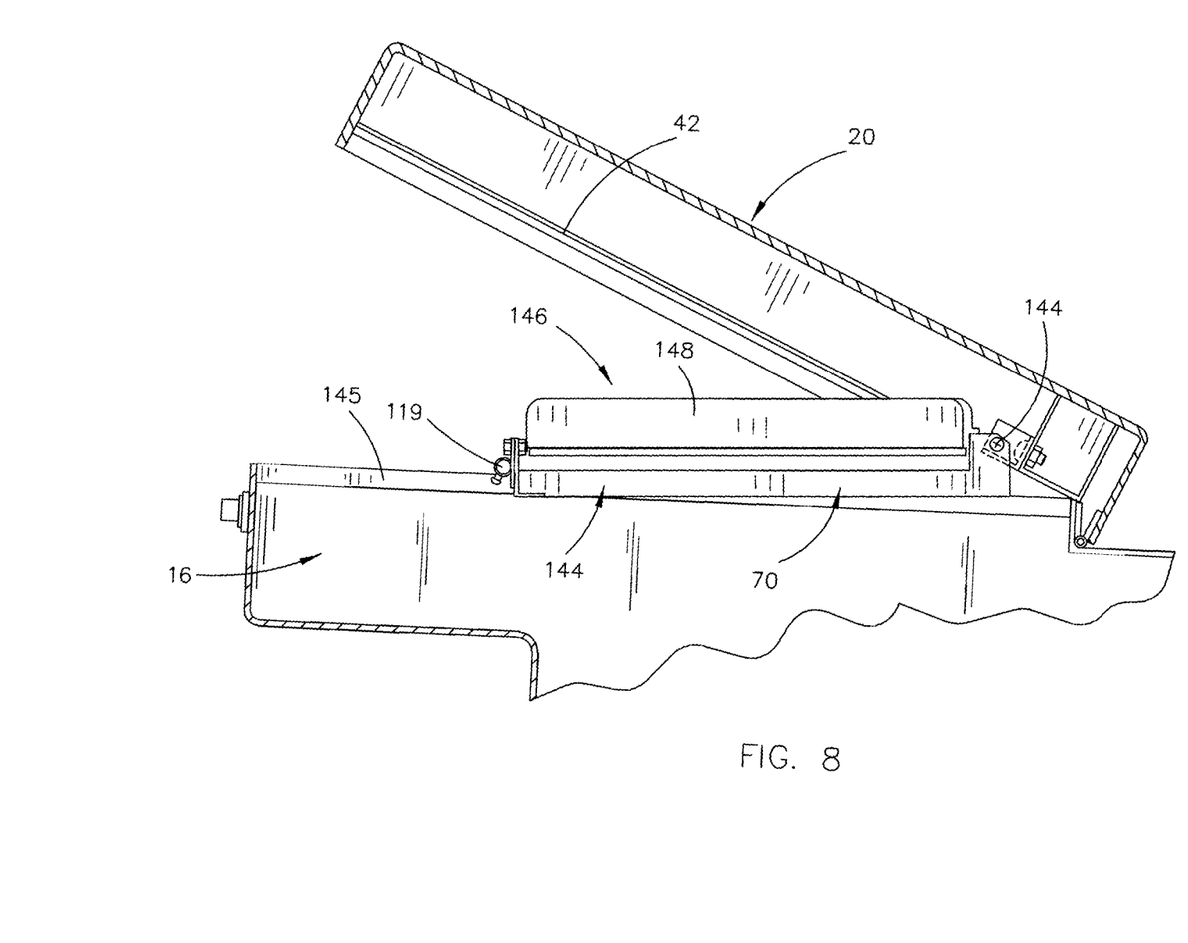
FIG. 8 is a sectional view similar to FIG. 7 except that the tray support frame and tray are in the display position.

Tray support frame 44 is pivotally or hingedly secured to lid 20 at the underside 24 of lid 20 between a stowed position and a display position. In its stowed position, support frame 44 is positioned adjacent the underside 24 of lid 20. Support frame 44 is maintained in its stowed position of FIG. 2 by the slide bolts 112 and 119 of slide bolt assemblies 106 and 114 respectively being in their extended position so as to extend over and above the flange 42 thereby limiting the downward movement of support frame 44 with respect to lid 20 (FIG. 2). When the lid 20 is in its open position of FIG. 8, the support frame 44 may be pivotally or hingedly moved to its display position by retracting slide bolts 112 and 119 so that they are not supported on the flange 42. The support frame 44 may then be hingedly moved downwardly into a substantially horizontally disposed position as seen in FIG. 8. The slide bolts 112 and 119 are then moved from their retracted positions to their extended positions so that the slide bolts 112 and 119 rest on the inwardly extending flange 145 at the upper end of the box 16.

Figure 1:
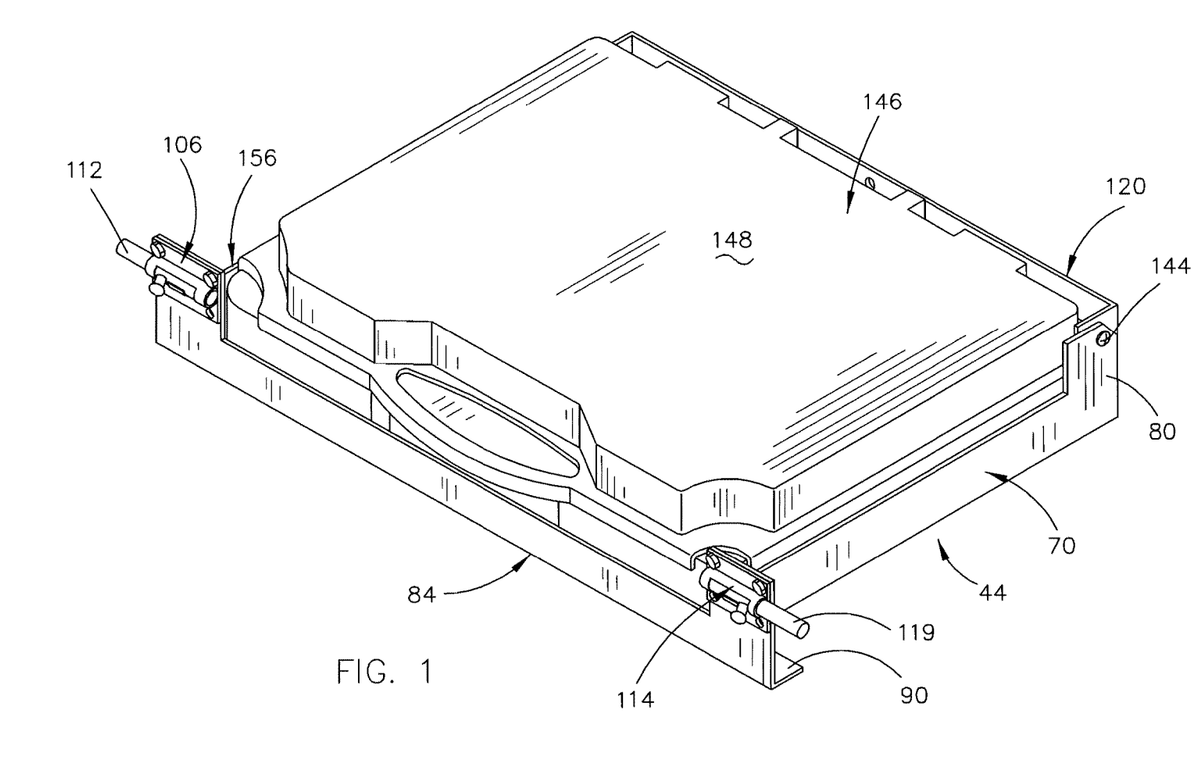
FIG. 1 is a perspective view of the tray support frame of this invention which has a tray selectively removably positioned thereon.
Figure 1A:
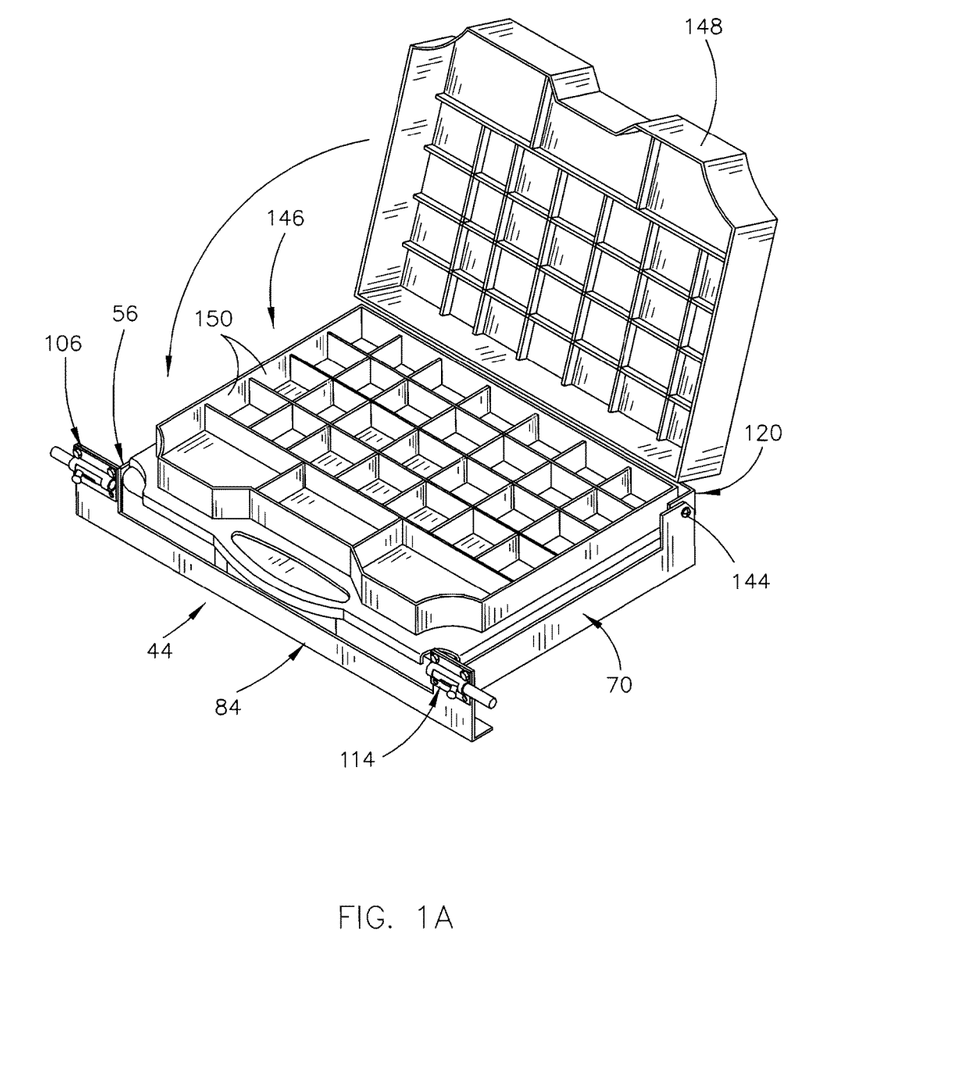
FIG. 1A is a perspective view similar to FIG. 1 but which illustrates the cover of the tray in its open position.

The support frame 44 is configured to receive a tray 146 for storing and displaying various small loose items such as screws, bolts, nuts, pins, etc. Tray 146 may be of any description as long as its dimensions permit it to be received between the frames 46, 56, 70 and 84. When so received, the tray 146 will rest on the flanges 52, 62, 80 and 90. It is preferred that the tray 146 have a lid or cover 148 which is hingedly or otherwise configured to close the compartments 150 in tray 146. Thus, when the lid 20 is in its closed position, or its open position, the tray 146 will be normally closely positioned at the underside 24 of lid 20 since the tray support frame 44 is held in its stowed position as previously described. When the lid 20 is in its open position, the tray support frame 44 and the tray 146 may be lowered to the position of FIG. 8. The lid 148 of tray 146 may be moved to its open position as seen in FIG. 1A to permit easy and convenient access to the items in the tray 146.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. A truck tool box, comprising:
a box portion having an upper end with at least one opening formed therein;
a lid having an underside;
said lid being hingedly secured to said box portion so as to be selectively movable between open and closed positions;
said lid closing said at least said one opening of said box portion when in its said closed position;
a tray support frame having an inner end, an outer end, a first side and a second side, said tray support frame comprising:

(a) an elongated and horizontally disposed inner angle member having a first end and a second end, comprising:
   (1) a lower flange member having a first end, a second end, an inner end and an outer end;
   (2) an upstanding side flange member, having a first end, a second end, a lower end and an upper end, which extends upwardly from said inner end of said lower flange member of said inner angle member;
(b) an elongated and horizontally disposed outer angle member having a first end and a second end, comprising:
   (1) a lower flange member having a first end, a second end, an inner end, and an outer end;
   (2) an upstanding flange member, having a first end, a second end, a lower end and an upper end, which extends upwardly from said outer end of said lower flange member of said outer angle member;
(c) an elongated first side angle member having a first end and a second end, comprising:
   (1) a lower flange member having a first end, a second end, an inner side and an outer side;
   (2) an upstanding flange member, having a first end, a second end, a lower end and an upper end, which extends upwardly from said outer side of said lower flange member of said first side angle member;
(d) an elongated second side angle member having a first and a second end, comprising:
   (1) a lower flange member having a first end, a second end, an inner side and an outer side;
   (2) an upstanding flange member having a first end, a second end, and a lower end and an upper end, which extends upwardly from said outer side of said lower flange member of said second side angle member;
said first end of said inner angle member being secured to said first side angle member at said first end thereof;
said second end of said inner angle member being secured to said second side angle member at said first end thereof;
said first end of said outer angle member being secured to said first side angle member at said second end thereof;
said second end of said outer angle member being secured to said second side angle member at said second end thereof;
an elongated and horizontally disposed angle support member having a first end, a second end, a lower flange and an upstanding flange;
said upstanding flange of said angle support member being secured to said lid of said truck tool box so as to be positioned at said underside of said lid;
said first end of said first side angle member being pivotally secured to said first end of said angle support member about a horizontal axis;
said first end of said second side angle member being pivotally secured to said second end of said angle support member about a horizontal axis;
said tray support frame being selectively pivotally movable between a stowed position adjacent said underside of said lid to a display position when said lid is in its open position;
said tray support frame including structure for maintaining said tray support frame in said stowed and display positions relative to said truck tool box; and
a tray positioned in said tray support frame between said inner angle member, said outer angle member, said first side angle member and said second side angle member.

2. The truck tool box of claim 1 wherein a cover is mounted on said tray.

3. The truck tool box of claim 1 wherein said tray is selectively removable from said tray support frame.

4. The truck tool box of claim 1 wherein said structure for maintaining said tray support from in said stowed and display positions includes a first slide bolt assembly at said first end of said outer angle member and a second slide bolt assembly at said second end of said outer angle member.

* * * * *